United States Patent [19]

Antoszewski et al.

[11] Patent Number: 4,652,133
[45] Date of Patent: Mar. 24, 1987

[54] VISION SYSTEM WITH ENVIRONMENTAL CONTROL

[75] Inventors: Richard S. Antoszewski, Glenshaw; Frank J. Sciulli, Crafton Borough; Jeffrey D. Taft, Murrysville; Jack W. Clements, North Huntingdon Township, Westmoreland County, all of Pa.

[73] Assignee: Westinghouse Electric Corp., Pittsburgh, Pa.

[21] Appl. No.: 756,002

[22] Filed: Jul. 17, 1985

[51] Int. Cl.[4] ............................................. G01B 11/24
[52] U.S. Cl. ............................... 356/376; 219/124.34
[58] Field of Search ............................... 356/375, 376; 219/124.34; 358/101

[56] References Cited

U.S. PATENT DOCUMENTS

| | | | |
|---|---|---|---|
| 3,898,445 | 8/1975 | MacLeod et al. | 356/375 |
| 4,501,950 | 2/1985 | Richardson | 219/124.34 |
| 4,555,613 | 11/1985 | Shulman | 219/124.34 |
| 4,567,347 | 1/1986 | Ito et al. | 219/124.34 |

OTHER PUBLICATIONS

Bangs, Welding Design & Fabrication, Nov. 1984, pp. 45–48.

Primary Examiner—F. L. Evans
Attorney, Agent, or Firm—Thomas R. Trempus

[57] ABSTRACT

A vision sensor for tracking includes a light stripe vision sensor for use in harsh environments. This light stripe generator is light source independent and produces a light stripe without the use of lenses. Additionally, the enclosure in which the light stripe generating and detecting means are mounted includes an environmental control system which provides pressurized, conditioned air into the apparatus enclosure in order to control the affects of dust, humidity and temperature variations countered in many working environments. This vision system is particularly well suited for use in welding applications and can be easily used in combination with an industrial manipulator to provide automated vision sensor capabilities.

5 Claims, 7 Drawing Figures

VISION SYSTEM WITH ENVIRONMENTAL CONTROL

FIELD OF THE INVENTION

This invention relates to vision sensors for tracking in general and more particularly, this invention is directed to a unique light stripe generator adapted for use in harsh environments. This invention also includes an improved pressurized conditioned air system which controls the affects of dust, humidity and temperature variations in harsh working environments.

BACKGROUND OF THE INVENTION

A light stripe seam tracking system tracks seams based on the geometry of a projected light stripe. Data collected through the use of a vision system is utilized to calculate three dimensional information describing for example part type, location and orientation. This information is then ultimately used to alter the path or control the operation of an industrial manipulator or a hard automation device.

Typically, vision systems have been large and delicate devices which were difficult to adjust and maintain within adequate alignment and calibration parameters. Methods of generating a light stripe have included combinations of rotating mirrors and lenses or lenses, mirrors and fiber optics. Inherent with schemes utilizing these known systems are the problems associated with worn components, the flexing and stressing of fiber optic bundles and blurred images. These systems are generally better equipped for laboratory operations rather than industrial applications. This is primarily because industrial applications encounter additional problems from condensation, vibration, temperature extremes or operation in a dirty or dusty environment.

It is therefore an object of this invention to provide a vision system for tracking which provides a higly reliable vision sensor and which overcomes the difficulties that have been associated with the industrial application of vision systems.

It is yet another object of this invention to provide a lightweight, economical and reliable vision system.

It is still another object of this invention to provide an improved enclosure in which a vision sensor system is mounted, the improved enclosure utilizing a pressurized, filtered and temperature controlled air supply to establish an environment which protects components within the enclosure from condensations and temperature extremes.

SUMMARY OF THE INVENTION

This invention provides a vision system which is particularly well suited for use in harsh environments. The vision system includes means for providing a light beam and directing this light beam toward a predetermined location. A convex mirror means is disposed in the light beam path for reflecting the light beam. As a result the light beam strikes the convex mirror means at multiple points thereon and is reflected as a stripe directed along a second predetermined path. Mirror means are mounted such that the light stripe is reflected from the second predetermined path to a substrate. The projected light beam thus striking the substrate is detected by a light detection means.

This invention also utilizes within the vision system enclosure an environmental control system. This environmental control system filters air to remove the majority of moisture and contaminants contained therein and then passes the filtered air through a vortec tube to produce both hot and cold conditioned air. A valving system controls the selection of air flow to be entered into a vision system enclosure. The air flow thus directed into the sensor enclosure creates a positive pressure and is exhausted around the enclosure lens. This dry conditioned air thus protects components within the vision system enclosure from condensation and extremes in temperature. Since the enclosure is pressurized, there is no path for dust and contaminants to enter. The exhausted air diverts smoke and dust away from the enclosure and prevents the adhesion thereof to the enclosure lens thus providing a clear field of view for the vision system for detecting the projected light stripe.

BRIEF DESCRIPTION OF THE DRAWINGS

The above as well as other features and advantages of this invention can be appreciated through consideration of the detailed description of the invention in conjunction with the several drawings in which.

DETAILED DESCRIPTION OF THE INVENTION

Figure 1:
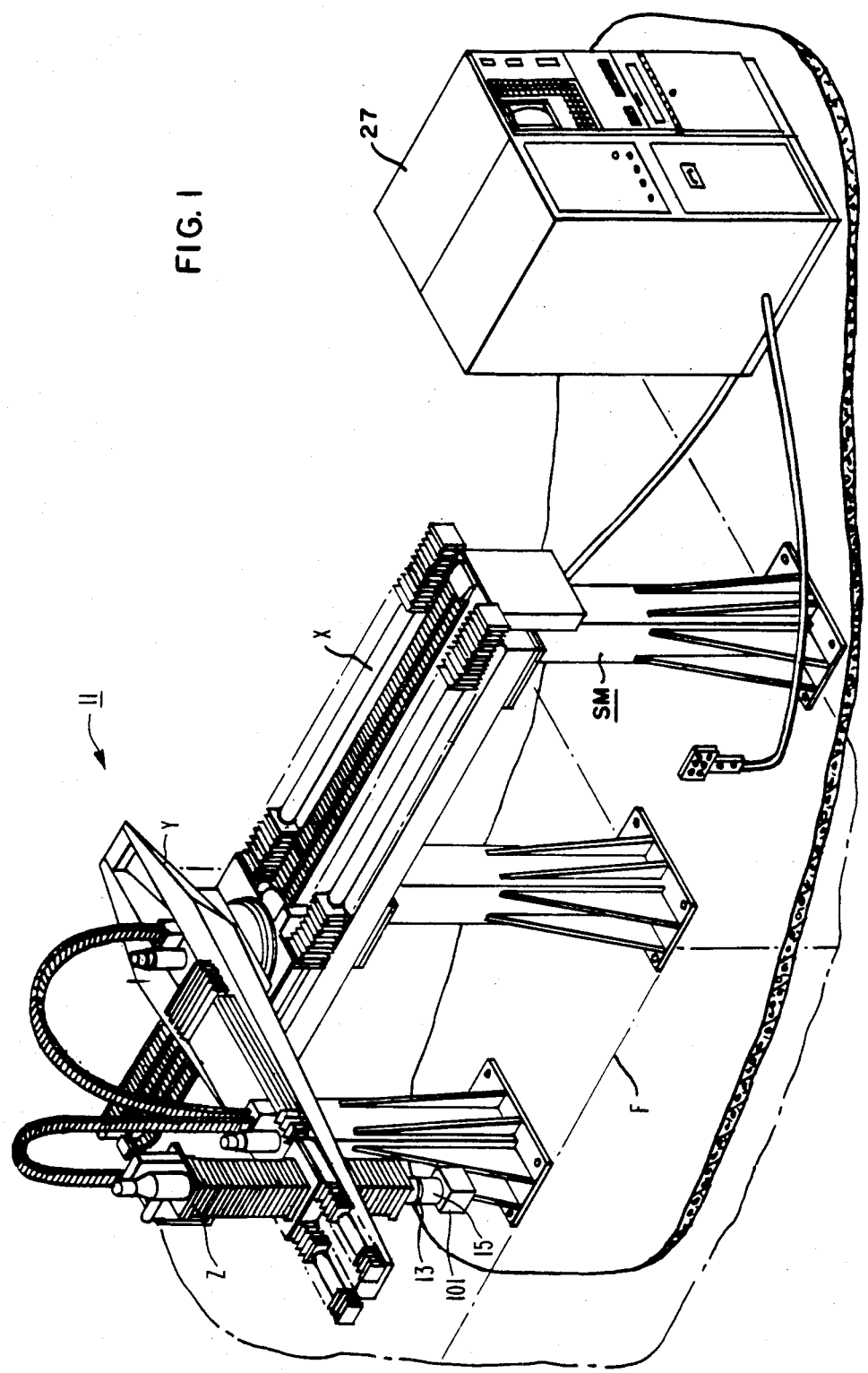
FIG. 1 is an isometric view of an orthogonal axis manipulator system which is used in combination with the preferred embodiment of this invention.
Figure 2:
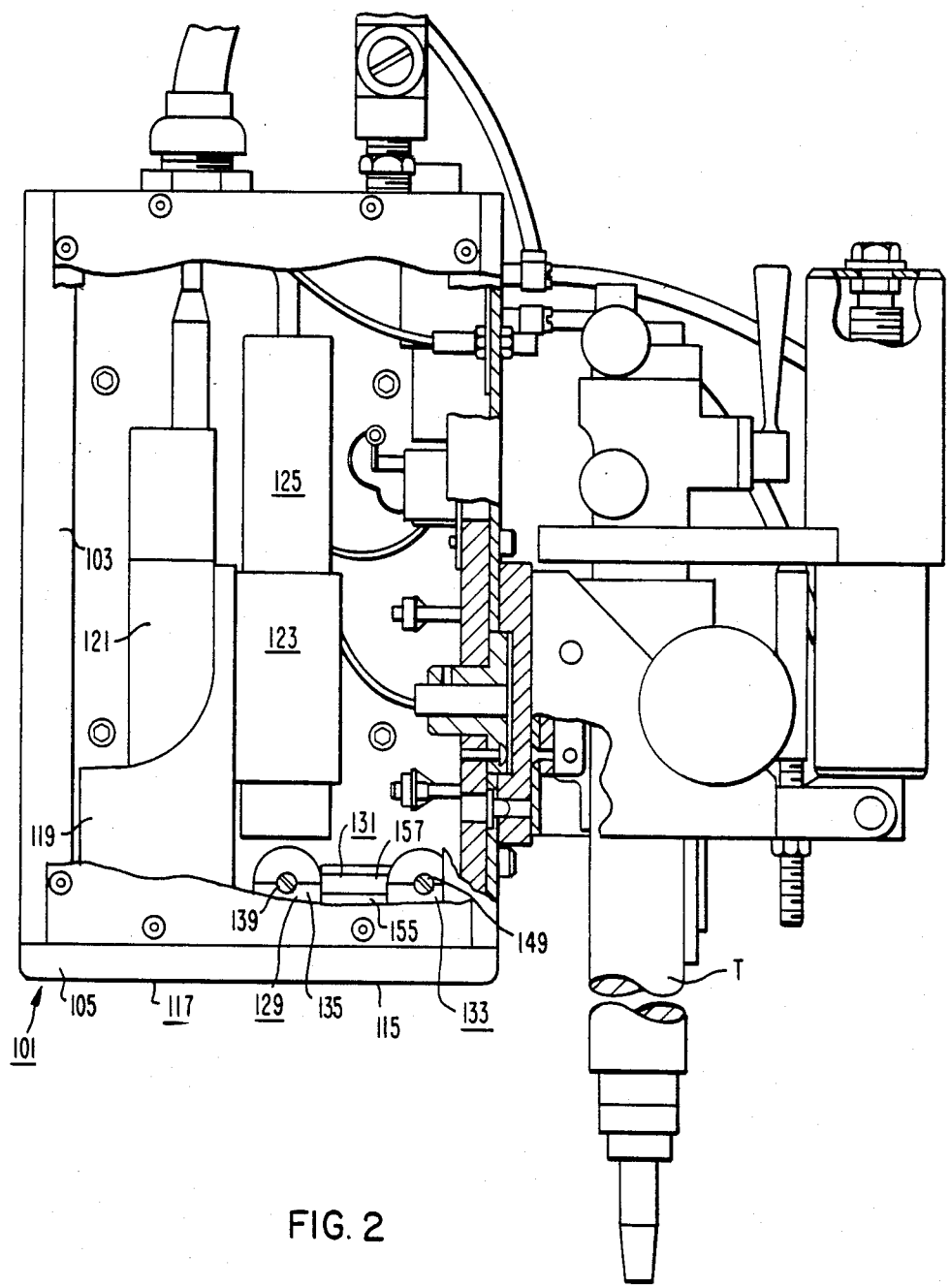
FIG. 2 is an elevational view with sections thereof cut away of the vision system of this invention used in combination with a welding torch.

The invention is a durable, compact, lightweight, light stripe generator vision system for use in harsh industrial environments. The unique light stripe generator of the vision system is light source independent and produces a light stripe without the use of lenses. The unique features of this invention permit a high degree of flexibility and an almost infinitely adjustable sensing range. The unit is highly reliable and in the preferred embodiment has no moving parts. As will be seen later, an automatic adjustment feature can be incorporated into the vision system in order to permit the automatic adjustment of the stripe reflecting mirror so that the projection of the light stripe corresponds to varied focal length lenses in a camera or light detector. The unit uses pressurized conditioned air to control the affect of dust, humidity and temperature variations within the system enclosure. This vision system can be used as a vision system on robotic or, for example, hard automation tracking systems. The vision system of this invention can be used in combination with a robot of the type isometrically presented in FIG. 1 and generally indicated by the reference character 11. The robot or industrial manipulator 11 is shown as an exemplar only and it is to be appreciated that any of a variety of robots can be used in combination with the vision system of this invention. The present invention has been incorporated successfully with the Unimate Series 6000 which is available from the Westinghouse Electric Corporation and shown in FIG. 1. This robot is more particularly described in U.S. patent application Ser. No. 485,076 entitled "General Purpose Orthogonal Axes Manipulator System" by Daniel P. Soroka et al., which application is assigned to the assignee of the present invention and incorporated herein by reference. The Unimate Series 6000 is an overhead gantry style robot with a large rectangular working envelope. This robot permits programming in Cartesian coordinates as contrasted with the more complicated polar coordinates. The operative combination of the X, Y and Z axes assembly is supported in gantry type configuration by the vertical support members SM which are secured to the floor F of the working facility. Machine tool-type control of the operation of the manipulator system is implemented by a conventional numerical control console 27 such as the VAL II ® System which is available from the Westinghouse Electric Corporation. This gantry robot design provides a rigid manipulator that supports machine tool-type interpolation moves, high accuracy and repeatability while permitting robotic-type velocity and dexterity. This gantry design provides for an overhead X axis assembly supported by vertical structural members SM. The Y axis assembly extends as an arm from the X axis assembly and further supports a vertical Z axis assembly. In addition to the orthogonal X, Y and Z axes assemblies, a mounting surface 13 on the Z axis assembly is designed to accommodate a multiple axis rotary wrist 15 to which an appropriate end effector for use in combination with the present vision system can be attached. This end effector can be a gripper, welding torch as shown in FIG. 2 and indicated by the reference character "T", or the like. The vision system can be utilized in both tracking applications and position locating applications.

Figure 3:
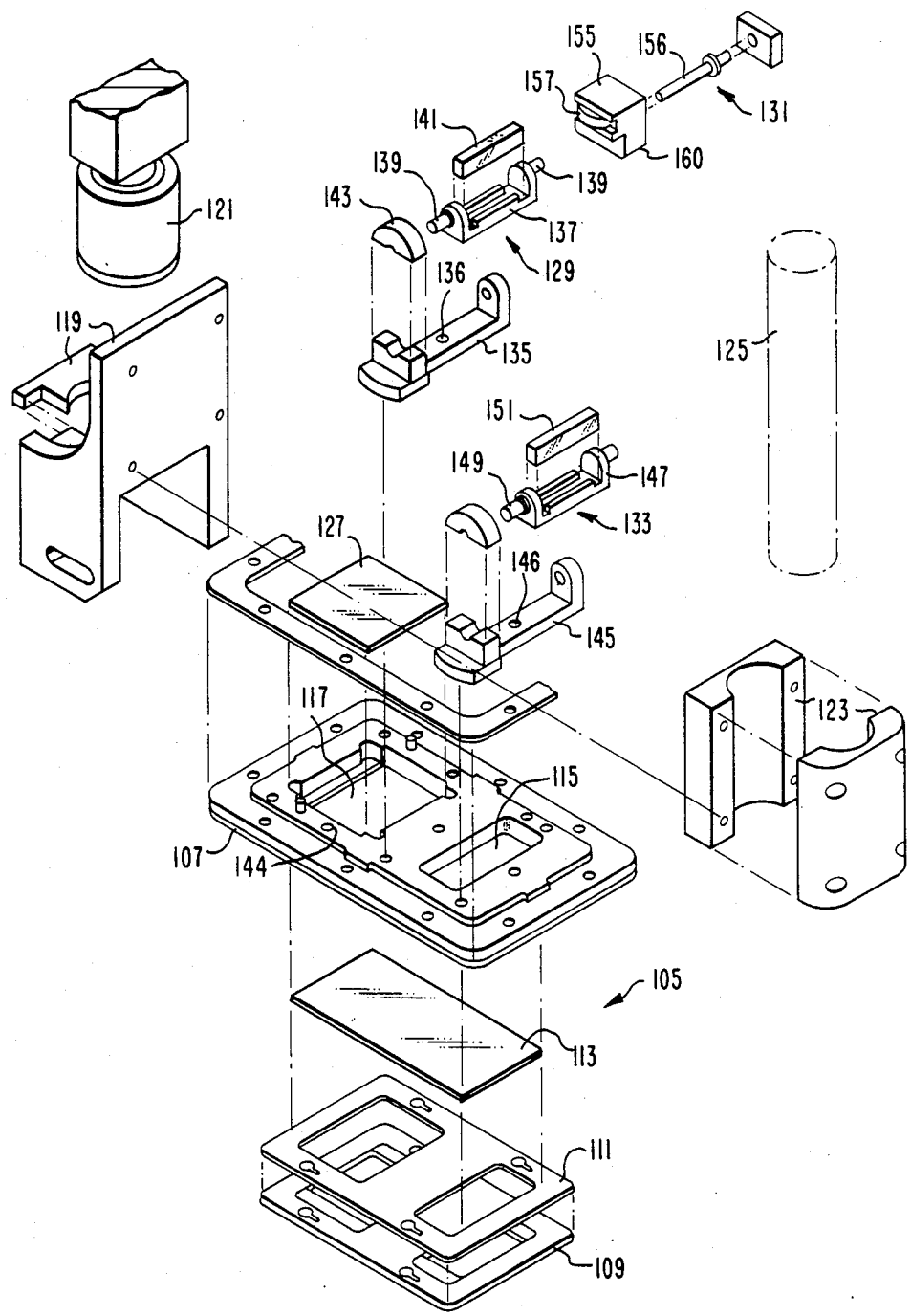
FIG. 3 is an exploded view of the vision system of this invention illustrating the principal elements of the light stripe generator of this vision system.

Considering now both FIGS. 2 and 3, the structure of the light stripe generator of this invention is shown as an elevational view with portions thereof cut away and an exploded view respectively. The light stripe generator generally indicated by the reference character 101 includes an enclosure 103 having a bottom generally indicated at 105. The bottom portion includes a base member 107 and a cover 109. Disposed between the cover 109 and the base 107 are a cover gasket 111 and a bottom glass section 113. The base member 107 has two window sections therein as at 115 and 117 wherein the light stripe is projected through window 115 and the camera detects the reflected light from the work surface through the window 117. The cover 109 is keyed to facilitate access to the enclosure 103 and the removal of the internal components for bench alignment.

The enclosure 103 includes bracket means as at 119 which is fastened to the base member 107 and supports a camera 121 therein. A suitable camera for use in this light stripe generating apparatus is the PULNiX TM-34K/TM-36K Series Solid State Cameras which are available from PULNiX AMERICA, Inc. of California. Further bracket means as at 123 support a commercially available laser 125 proximate thereto. A suitable laser for use in this light stripe generator apparatus is available from UNIPHASE of Sunnyvale, Calif. The preferred laser is a heliumneon 0.95 MW class II laser. A filter 127 can be mounted over the window 117. The filter tends to minimize the adverse effects of ambient lighting, weld flash, etc.

The preferred embodiment of this invention utilizes three mirror structures 129, 131 and 133. It should be appreciated that the actual mirror structure can be varied as will be described in conjunction with later figures in which the light path geometry is more fully described. The first mirror structure 129 includes a mounting bracket 135 which is supported on the base member 107 by a securing means such as fastener 136. The mounting structure 135 supports a mirror mounting bracket 137 with pivot shafts 139 at each end thereof. A mirror member 141 is secured to the pivot bracket 137 preferably through the use of silicon adhesives. After the mirror member 141 is mounted in the pivotable bracket 137 alignment can be achieved through the rotational movement of the pivotable bracket 137 within the mounting structure 135 and rotational movement of the mounting bracket 135 about fastener 136. When the proper alignment is achieved, the clamp members 143 and fastener 136 can be tightened. Similarly, the mirror structure 133 also includes a mounting structure 145 in which a pivotable bracket 147 having pivot shafts 149 thereon is mounted. Mounting structure 145 rotates about fastener 146. A mirror member 151 is mounted within the pivotable bracket 147 by means of a silicon adhesive. Once proper alignment of the mirror member 151 is achieved the clamp member 153 and fastener 146 secure the pivotable bracket in the selected position.

The convex mirror 131 includes a mounting bracket 155 in which the mirror member 157 is mounted. The mirror member is a convex mirror which was formed from a cylindrical lens overcoated with aluminum on the curved surface thereof. This lens has a focal length of 40 mm (F40). Mounting bracket 155 is adapted for translational movement along shaft 156 which extends from mounting means 158 and can be provided with a beveled way system as at 160 at the bottom thereof.

In operation, a light beam from a light source which prferably is a laser 125 but can of course be other sources such as tungsten halogen light source, is reflected from the mirror 141 of the mirror structure 129 and directed toward the cylindrical or convex mirror structure 131. The light beam has some finite thickness and for the purpose of explanation may be thought of as a bundle of many tiny beams since the first and last beam in the bundle strike the cylindrical mirror at a different position thereon with respect to the center of the light beam or light bundle. The incident and reflected angles are different for each individual light beam and thus the light beam is spread out into a stripe. After reflection from the cylindrical mirror 157 of convex mirror structure 131, the generated light stripe is directed toward a predetermined work surface target by the mirror structure 133.

While typically it is to be expected that once the mirror structure 129 is adjusted, no further adjustment thereto will be required, it should be noted that the mirror structure 133 is adjustable and can be used to direct the light stripe to the work surfaces in order to match the focal length of the camera and lens arrangement as at 121. This adjustment can be made manually or can be driven with a servo drive to match a changing focal length. In other words, a servo drive unit can be mechanically incorporated with both the camera 121 and the second mirror structure 133 in order to automatically adjust each unit. As indicated above, the light source, camera and several mirror structures mounted on the base member can be removed as a unit for bench testing and alignment.

Figure 4A:
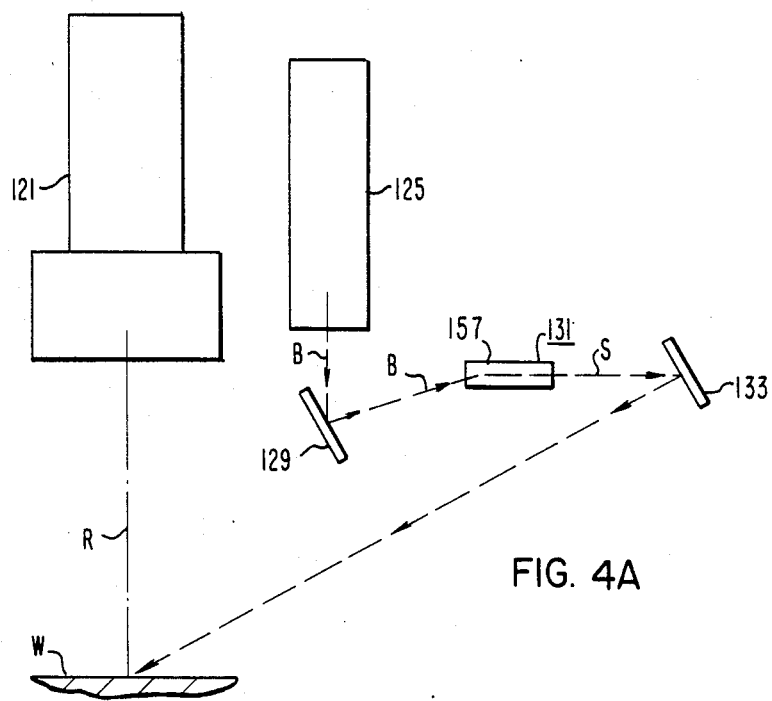
FIGS. 4A, 4B and 4C are schematic representations of several optical configurations of the vision system of this invention.

The preferred light path for the light stripe generating apparatus of this invention in the embodiment of FIGS. 2 and 3 can be more clearly seen in FIG. 4A in which the light source 125 provides a light beam which is reflected by the first mirror member of the mirror structure 129. The initially reflected light beam indicated by the reference character B strikes the mirrored surface of the mirror structure 129 and is directed to the cylindrical mirror member 157. The light beam B is reflected by the cylindrical mirror member 157 of the convex mirror structure 131 as a stripe indicated by the reference character S. The light stripe so generated is then reflected from the mirror member of the mirror structure 133 as at RS to the work surface W. The reflected light from the work surface W is detected by the camera means 121 for appropriate processing by means of associated signal processing means not illustrated herein.

Figure 4B:
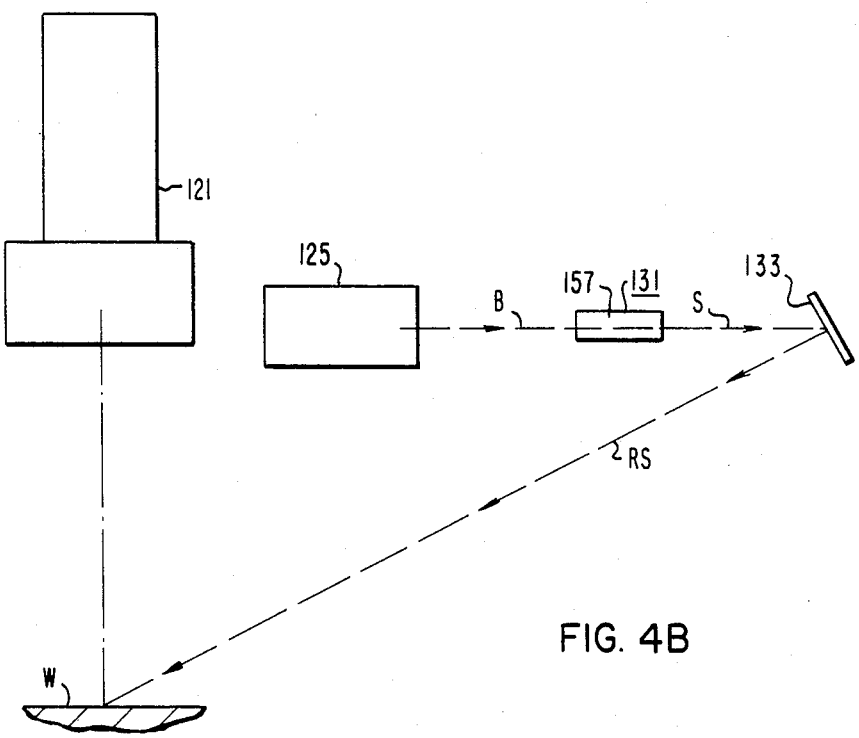
Figure 4C:
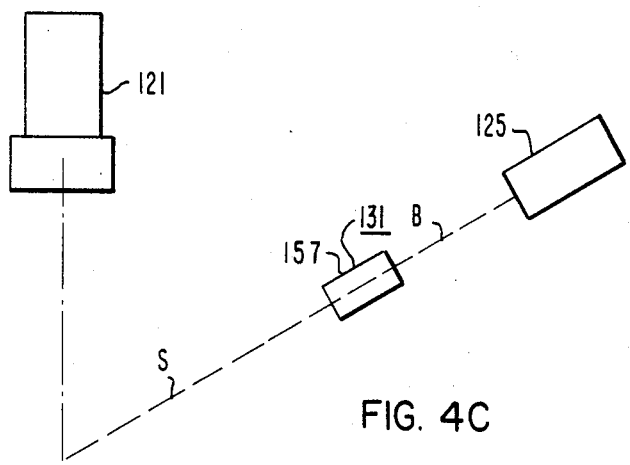

FIGS. 4B and 4C illustrate alternative arrangements of the optical configuration of the present apparatus. In the alternative embodiment of FIG. 4B, the first mirror structure 129 is eliminated and the light beam B from the light source 125 is directed directly to the cylindrical mirror member 151 of the convex mirror structure 131. The light stripe is then reflected by the mirror structure 133 to the work surface. In the alternative optical configuration of FIG. 4C, the second mirror structure 133 is also eliminated and the light source directs the light beam directly on to the cylindrical mirror member 157 of the convex mirror structure 131. The light stripe is then projected directly to the work surface W from the cylindrical mirror member 157. While alternative configurations have been presented, the preferred embodiment shown in FIGS. 2, 3 and 4A represents a more compact apparatus.

Figure 5:
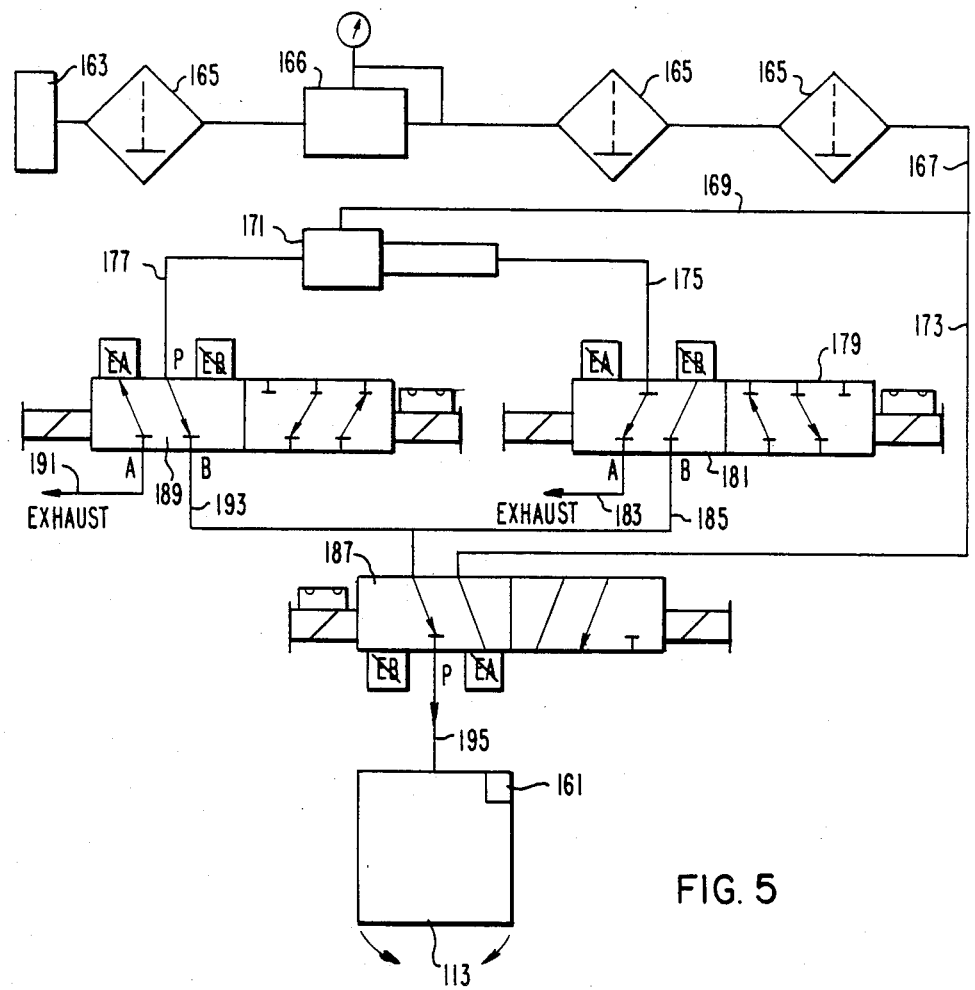
FIG. 5 is a schematic representation of the environmental control system for use in combination with the vision system of this invention.

Turning now to FIG. 5, the environmental control system for use in combination with the vision apparatus enclosure 103 is schematically represented as a pneumatic control system. A commercially available temperature switch means 161 is used to sense the need for hot, cold or ambient air within the enclosure 103 which defines the housing in which the light stripe generating light source, camera and mirror means are disposed. The switch means 161 directs the several solenoid controlled valves described below. An ambient air supply 163 is provided and it is initially delivered through several filters as at 165 in order to remove the majority of moisture and contaminants contained therein and regulator means 166. The purified air is then directed through a commercially available vortec tube to produce hot or cold conditioned air. The filtered air passes through line 167 where it enters a T fitting and can be directed to lines 169 where it is introduced into a vortec tube 171 or directed through line 173. The dry air passing from the filters through line 167 to 169 and then the vortec tube 171 is converted by the vortec tube into two streams, a hot stream passing through line 175 and a cold stream passing through line 177. An appropriate vortec tube which can be used in the present application is commercially available from Vortec Corporation, Cincinnati, Ohio. Hot air generated by the vortec tube 171 passes through line 175 and enters a solenoid controlled valve means. Solenoid 179 controls the valve member 181 whereby the hot dry air can be directed either to an exhaust 183 or to a further line 185 where it enters the master control valve 187. Cold air leaves the vortec tube 171 via line 177 and enters valve 189 wherein the cold air can be exhausted through line 191 or directed via line 193 to the master valve 187. The master valve 187 additionally selects between conditioned air or ambient dry air coming from line 173 thereinto. The appropriately selected air is then directed from the master valve 187 through lines 195 to the enclosure 103 of the vision sensor apparatus. Air flow directed into the sensor enclosure creates a positive pressure and is exhausted, as indicated by the arrows around the enclosure lens or bottom glass 113, through ports 144 (FIG. 3). This dry conditioned are is utilized to protect components from condensation and extremes in temperature when the vision system is operated in harsh environments such as in welding operations. Since the enclosure is pressurized, there is no path for dust and/or contaminants to enter. The exhausted air diverts smoke and dust away from the enclosure 103 and prevents adhesion to the enclosure lens 113 by contaminants thus providing a clear field of view.

What has been described is an improved vision sensor for tracking which is a durable, compact, lightweight, light stripe vision sensor for use in harsh industrial environments. The unique light stripe generator is light source independent and produces a light stripe without the use of lenses. The configuration of this invention permits a high degree of flexibility and an almost infinitely adjustable sensing range. The apparatus of this invention is highly reliable and in the preferred embodiment has no moving parts. This invention additionally uses pressurized, conditioned air to control the affects of dust, humidity and temperature variations within the enclosure of the apparatus.

What is claimed is:

1. A vision sensor system comprising in combination a vision sensor apparatus and an environmental control system for said vision sensor apparatus which apparatus comprises:
    a sensor enclosure means including a base member having ports therein;
    light detecting means mounted within said enclosure means and capable of selectively focusing onto a predetermined point on a work surface;
    means for generating a light beam for propagation along a first predetermined path, mounted within said enclosure means;
    first mirror means mounted in said enclosure means for directing said light beam from said first predetermined path to a second predetermined path;
    convex mirror means disposed in said enclosure means along the second path for reflecting said light beam, wherein said light beam strikes said convex mirror means at multiple points thereon and is reflected as a stripe directed along a third predetermined path; and
    second mirror means mounted in said enclosure means for reflecting said stripe from said third predetermined path to the work surface for detection thereon by said light detector means wherein features of the work surface are evidenced by the geometry of the light stripe projected thereon wherein the light detecting means, light generating means, convex mirror means and first and second mirror means disposed within the enclosure means are mounted on said sensor enclosure means base member and wherein the base member is removably secured to the enclosure means such that the above-identified components mounted on said base member can be removed from said enclosure means while mounted on said base member for test and alignment;

and wherein said environmental control system is in communication with said sensor enclosure means for delivering pressurized conditioned air thereto, said environmental control system comprising:

means for sensing the temperature within said sensor enclosure means;

means for selectively providing a source of filtered dry hot air, filtered dry cold air and/or filtered ambient air; and valve means in communication with the air providing means and responsive to the sensing means for effecting the delivery of conditioned air under pressure to said sensor enclosure wherein the environment within the housing is maintained within a predetermined temperature range despite temperature variations in the environment and said ports in said base member direct the flow of pressurized conditioned air about the outside of said base member.

2. The system of claim 1 wherein the means for generating a light beam is a laser.

3. The system of claim 1 wherein the first and second mirror means and the convex mirror means are adjustable.

4. The system of claim 1 in combination with a robotic system of the type having an X, Y and Z axes assembly supported in gantry type configuration with an overhead X axis supported by vertical structural members, a Y axis assembly extending from the X axis assembly and a vertical Z axis assembly supported by the Y axis and wherein the vision system is operatively associated with the Z axis.

5. The system of claim 1 wherein the convex mirror means is a cylindrical lens overcoated with aluminum on the curved surface thereof.

* * * * *